Figure 10:
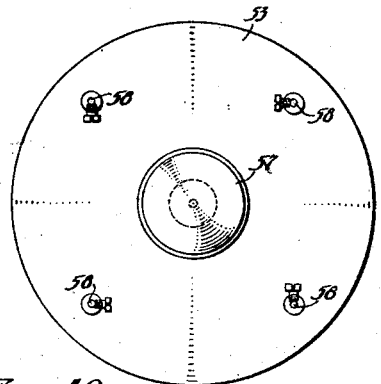

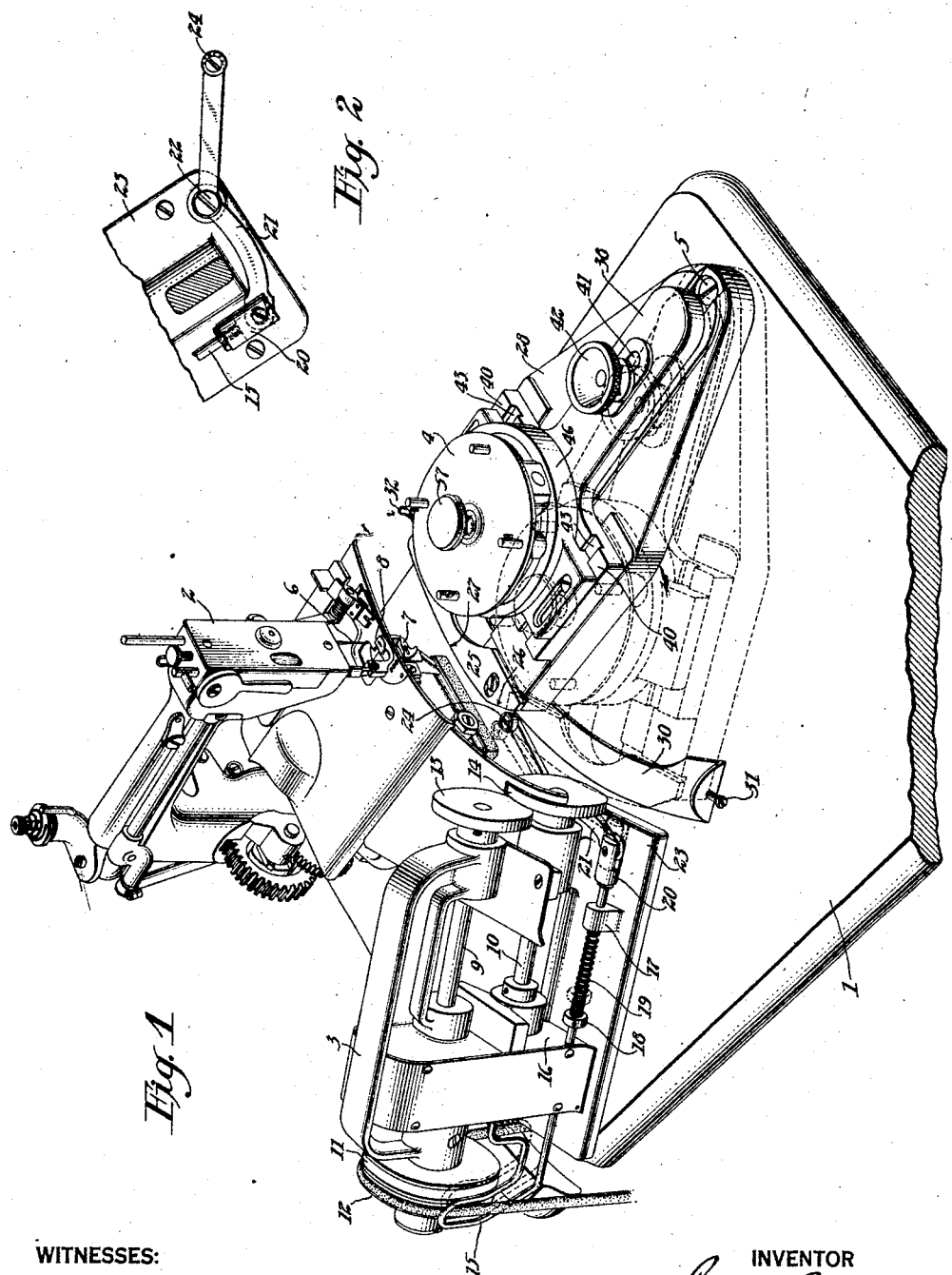

June 8, 1926.
R. BECKER
1,588,001
MACHINE FOR MAKING HAT LININGS
Filed Sept. 29, 1921        5 Sheets-Sheet 2
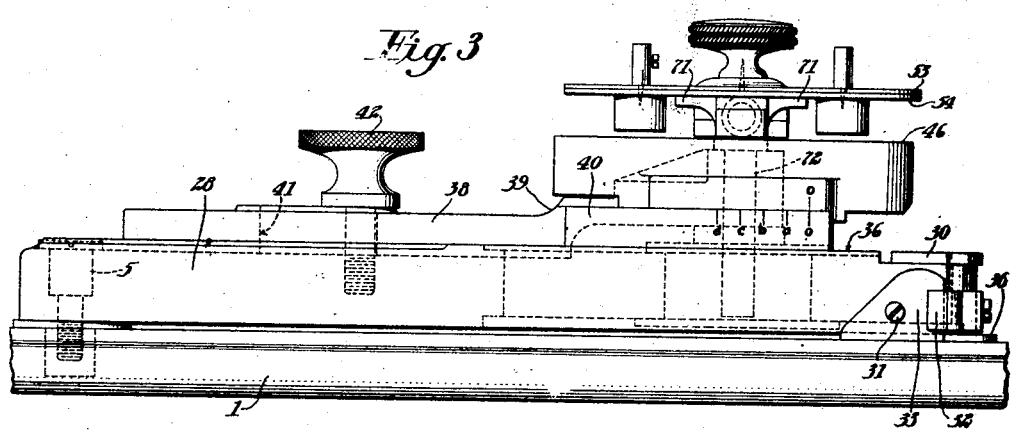
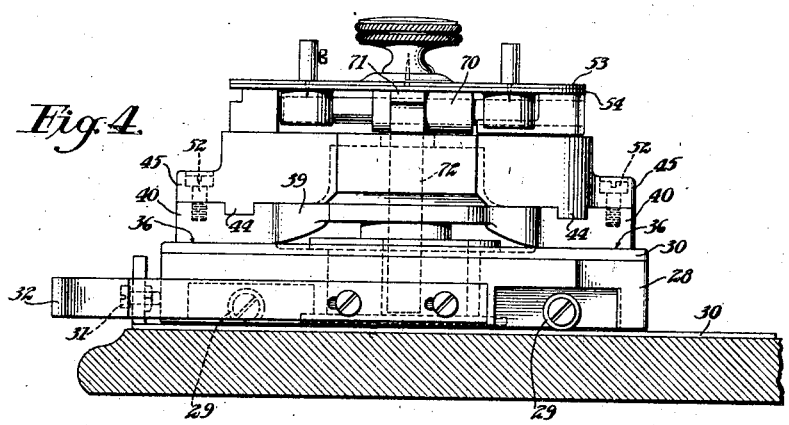
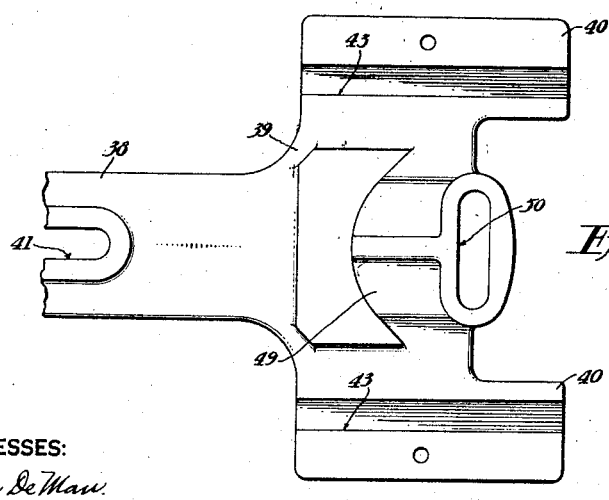
WITNESSES:
INVENTOR
Rudolph Becker
BY Henry J. Miller
ATTORNEY June 8, 1926.
R. BECKER
1,588,001
MACHINE FOR MAKING HAT LININGS
Filed Sept. 29, 1921 5 Sheets-Sheet 3
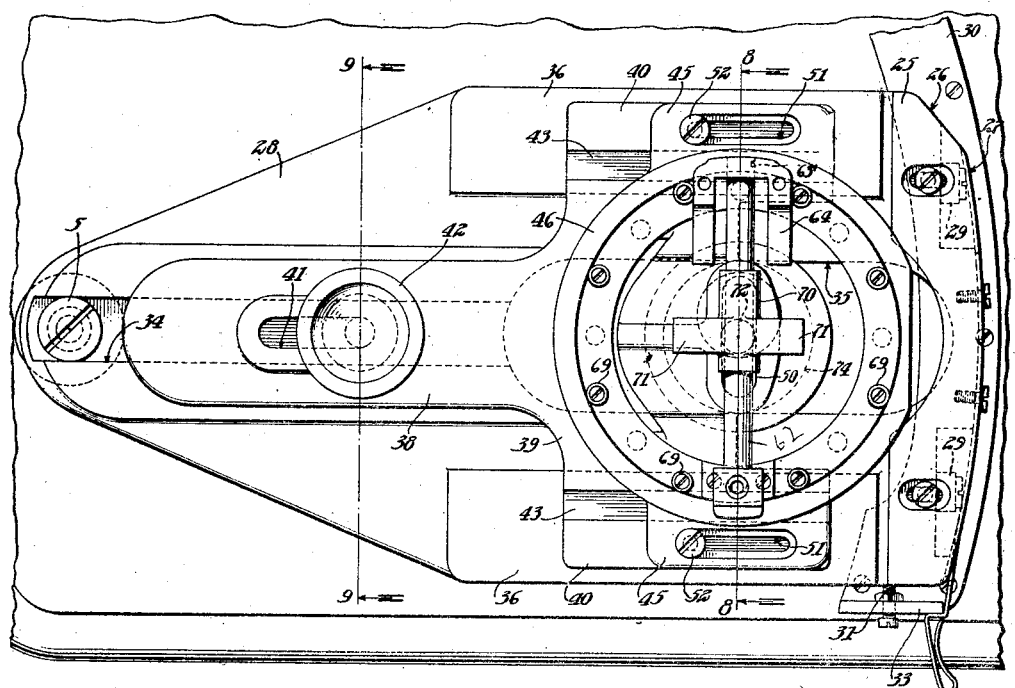
Fig. 5
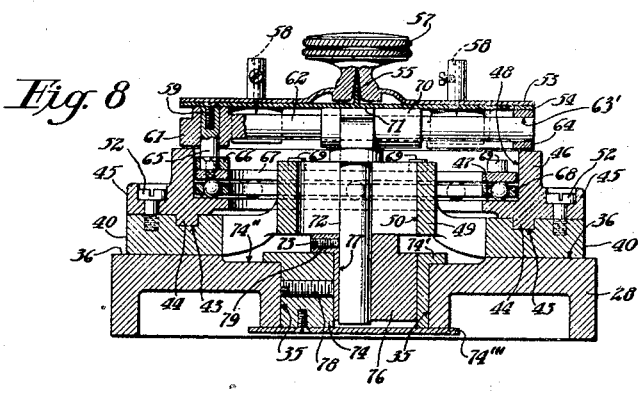
Fig. 8
Fig. 12
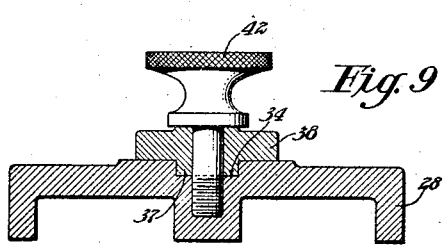
Fig. 9
WITNESSES:
Adrian De Man
John F. Heins
INVENTOR
Rudolph Becker
BY
Henry J. Miller
ATTORNEY June 8, 1926.

R. BECKER 1,588,001

MACHINE FOR MAKING HAT LININGS

Filed Sept. 29, 1921    5 Sheets-Sheet 4

WITNESSES:
Adrian De Man
John F. Hing

INVENTOR
Rudolph Becker
BY
Henry J. Miller
ATTORNEY

June 8, 1926.
R. BECKER
MACHINE FOR MAKING HAT LININGS
Filed Sept. 29, 1921      5 Sheets-Sheet 5
1,588,001
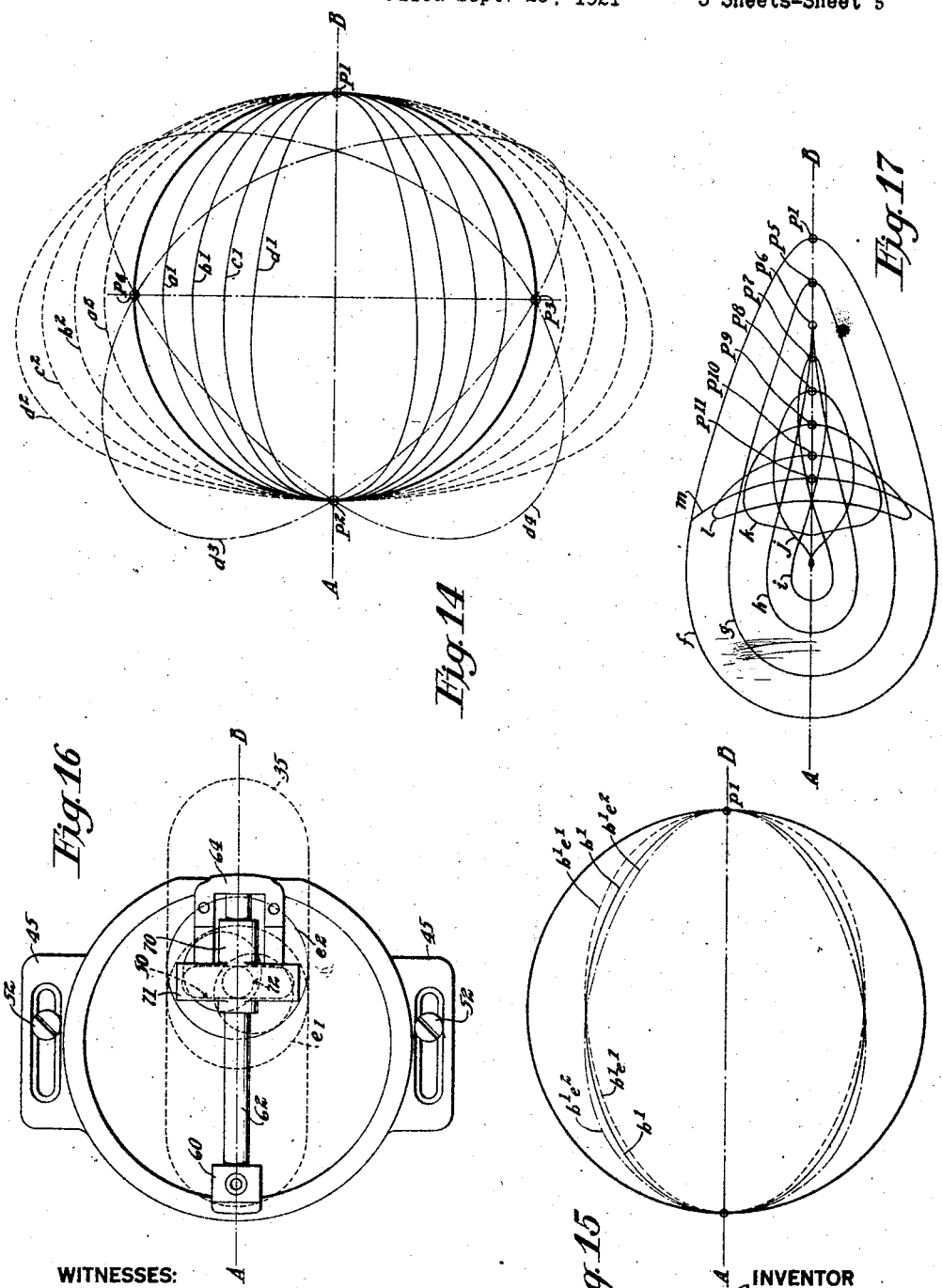

Patented June 8, 1926.

1,588,001

UNITED STATES PATENT OFFICE.

RUDOLPH BECKER, OF ROSELLE PARK, NEW JERSEY, ASSIGNOR TO THE SINGER MANUFACTURING COMPANY, OF ELIZABETH, NEW JERSEY, A CORPORATION OF NEW JERSEY.

MACHINE FOR MAKING HAT LININGS.

Application filed September 29, 1921. Serial No. 504,094.

Machines for making hat linings commonly comprise a sewing machine with which is associated a work-support in the form of a turn-table rotatable about a shifting center and serving as a support for the hat lining, whereby such lining is so presented to the needle of the sewing machine that the stitches are laid in an elliptical path approximating the shape of the crown of a hat. It is also customary to associate a cutting machine with the turn-table and provide for the moving of the turn-table from the sewing machine to the cutting machine to effect the trimming off of the surplus material outside of the line of stitches.

The cutting machine commonly comprises a pair of continuously rotating disks mounted on parallel shafts placed one above the other and turning in opposite directions, the edges of the disks overlapping so as to cut with a shearing action. The continuous running of the cutting machine wastes power, since it is only needed at intervals between sewing operations, and manual control of the starting and stopping of the cutting machine would add to the burdens of the operator and prevent the attainment of maximum production.

An object of the present invention, therefore, is to provide for the automatic control of the starting and stopping of the cutting machine so that it will run only when needed and will not be consuming power when not needed.

Heretofore, the turn-table mechanism of machines of the class described has been so constituted that the line of sewing was in the form of a true ellipse, the opposite ends being of equal curvature. It is well known, however, that the crown of a hat is not truly elliptical but is somewhat egg shaped, i. e., in the form of an oval having a narrowed front end and a broadened rear end. Truly elliptical hat linings, therefore, such as produced on prior machines, do not closely conform to the shape of the crowns of hats of usual form.

Another object of the present invention is to provide a turn-table mechanism particularly adapted for machines of the class described, and possessing adjustments such that the stitches may be laid in any selected one of a wide variety of figures, including egg-shaped ovals of any desired size or degree of departure from the true ellipse, thus enabling a hat lining to be sewed to the exact size and shape required to nicely conform to a given hat.

Still further, the invention has for an object the provision of a novel mechanical motion of general application as, for example, to the work-holder mechanism of engraving machines, geometrical instruments, lathes and the like.

According to the present improvement, in its preferred embodiment, the starting and stopping means for the cutting mechanism is connected to be controlled by the shifting of the turn-table from the sewing machine to the cutting machine. The starting and stopping means is preferably connected to a control-lever which extends into the path of movement of the turn-table support so that when the latter is shifted to carry the work from sewing to cutting position, a cam-edge on such support engages and shifts the control-lever and thus causes the cutting machine to start. When the turn-table is returned to sewing position, a spring restores the control-lever to stopping position.

For the purposes of this disclosure the present novel mechanical motion is embodied in a turn-table mechanism comprising a work-supporting plate carried by a horizontal rod which is pivoted vertically at one end to a guide-ring running in a circular raceway and adapted to confine the pivot point to move in a circular path. The rod also passes through a horizontal sleeve which is mounted on a vertical shaft, the axis of which may be so confined as to be fixed or caused to move to-and-fro in a vertical plane to any desired extent by a suitable adjustable eccentric mounted on the vertical shaft and operating in a fixed guideway. The guide-ring is adjustable so as to secure any desired displacement of its axis of rotation from the axis of rotation of or the vertical plane of movement of the shaft carrying the guide-sleeve.

The invention will be understood from the accompanying drawings and the following detailed description of a machine which embodies the invention in a form suitable for sewing hat linings.

Figure 11:
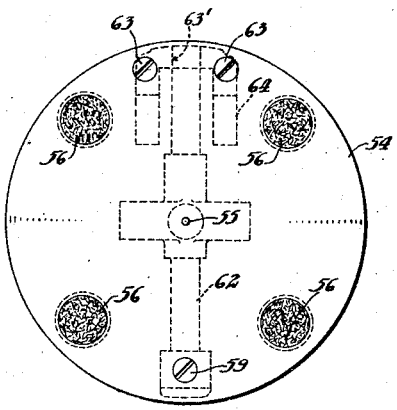
Figure 13:
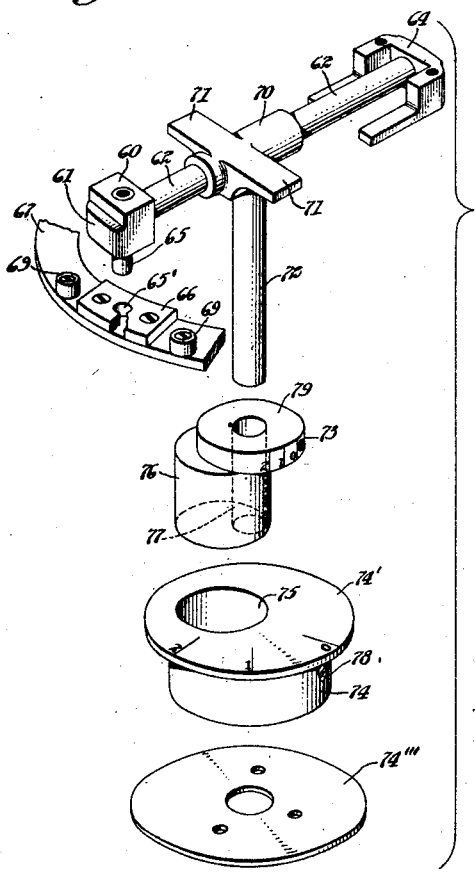
Figure 7:
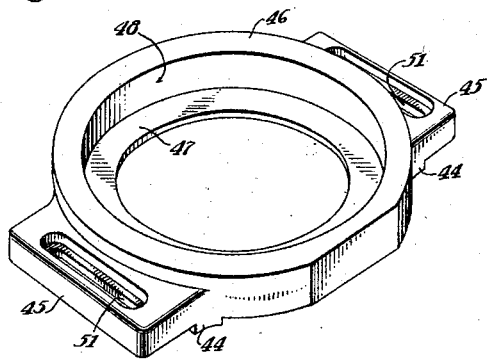

In the drawings, Fig. 1 is a view of a complete outfit embodying the invention. Fig. 2 is a plan view showing the controlling lever for the cutting mechanism. Fig. 3 is a side elevation of the turn-table mechanism or work-support. Fig. 4 is an end elevation of the same. Fig. 5 is a top plan view of the same. Fig. 6 is a fragmentary top plan view of a carrier-element of the work-support. Fig. 7 is a perspective view of the curb or casing element which is adjustably mounted upon the carrier shown in Fig. 6. Fig. 8 is a sectional view on the line 8—8, Fig 5. Fig. 9 is a sectional view on the line 9—9, Fig. 5. Fig. 10 is a top plan view of the upper work-holding plate. Fig. 11 is a top plan view of the under work-holding plate. Fig. 12 is a fragmentary sectional view of the upper and lower work-holding plates showing the means for preventing slippage of the work. Fig. 13 is a disassembled perspective view of parts of the mechanism for controlling motion of the turn-table. Figs. 14 and 15 are diagrammatic views illustrating various patterns which may be produced by use of the invention. Fig. 16 is a view illustrating the adjustment of the parts of the mechanism to produce the results illustrated in Fig. 15, and Fig. 17 is a view similar to Figs. 14 and 15 and illustrating further possibilities of the device.

The complete machine embodying the invention and adapted for sewing hat linings comprises three units associated on a suitable support 1; such units comprising a sewing machine 2, a cutting machine 3, and a work-carrier 4 which latter is pivoted at 5 to the support 1 so that it may swing about its pivot from full line or sewing position adjacent the sewing machine, Fig. 1, to dotted line or cutting position adjacent the cutting machine 3 and vice versa.

The sewing machine may be of any suitable type such, for example, as the well known Singer Class 24—60 chain-stitch machine having the usual stitch-forming and feeding mechanisms including the reciprocating needle 6, rotary looper 7 and presser-foot 8 with which the usual four-motion feed-dog (not shown) cooperates to feed the work.

The cutting mechanism is of the usual construction and comprises the upper and lower shafts 9 and 10 which are rotated in opposite directions by suitable connections with the tight belt-pulley 11 alongside of which is mounted the loose pulley 12 to receive the belt when the cutting mechanism is idle. The shafts 9 and 10 carry the cutter-wheels 13 and 14 which are associated in the usual manner with their peripheral portions in overlapping relation so as to cut with a shearing action. In the present instance, a belt-guide 15 is mounted to slide horizontally in suitable supports 16, 17 on the frame; said guide carrying a collar 18 and a spring 19 interposed between the latter and the bearing support 17 and serving to urge the belt-guide to stopping position or toward the loose pulley 12. The belt-guide has secured to it a split head 20 which receives and is pivotally connected to the slotted end of a lever 21 pivoted at 22 to the base 23 of the cutting mechanism and at its other end carrying a roller 24 which is positioned in the path of movement of the cam-plate 25 mounted on the work-carrier 4. The cam-plate 25 has an inclined portion 26 and a portion 27 which is concentric with the pivot 5.

It will be evident that when the work-carrier is in sewing or full line position, Fig. 1, the cutting mechanism will be stationary since the spring 19 will hold the belt on the pulley 12. When the work-carrier 4 is shifted to cutting position, however, the inclined edge 26 of the cam-plate 25 will encounter the roller 24 and rock the lever 21, thereby effecting the shift of the belt from the loose to the tight pulley and the consequent starting of the cutting machine. This action will be entirely automatic, it being unnecessary for the operator to make any motions additional to the motion of shifting the work in the usual way toward and from the cutting mechanisms between sewing operations.

The work-support or turn-table mechanism embodying the present novel mechanical motion and indicated generally by the numeral 4, Fig. 1, comprises an elongated base-plate 28, Fig. 5, pivoted at one end, as described, to the support 1 by means of the pivot-screw 5 and provided at its opposite end with rollers 29 running on the track 30; said track having stop-screws 31 at its opposite ends to fix the extreme positions of the work-carrier. A spring-latch 32, mounted on the base-plate 28 cooperates with the upturned flange 33 at one end of the track 30 to lock the work-carrier in sewing position. The base-plate 28 is formed along its longitudinal center line with a guiding groove 34 and guide-slot 35 in end-to-end relation. It is also formed at opposite sides of the guide-slot 35 with raised supporting ways 36. The groove 34 receives the rib 37, Fig. 9, at the under side of the stem 38 of a carrier-frame 39, Fig. 6, having lateral wings 40 which rest upon the supporting ways 36. The stem 38 of the carrier-frame is formed with a slot 41 through which passes the shank of the thumb-screw 42.

The wings 40 of the carrier-frame 39 are formed with grooves 43 for reception of the ribs 44 on the under side of the wings 45 of the curb or casing member 46 having an internal circular supporting ledge 47 and a cylindrical wall 48 forming a raceway. The carrier-frame is also formed with a bridge-member 49 connecting the wings 40 and formed with a guide-slot 50 which extends transversely of or at right angles to the grooves 43. The portion of the bridge-member 49 surrounding the slot 50 extends well up into the space within the curb 46 as shown in Fig. 8. The wings 45 of the curb 46 are formed with slots 51 through which pass the holding screws 52. This construction permits adjustment of the curb 46 at right angles to the guide-slot 50 to effect alteration of the shape of the path of movement of the work relative to the operating implement or needle of the sewing machine.

In the particular embodiment of the invention illustrated, the work $w$, Figs. 8, 10, 11 and 12, is held as usual between upper and lower clamping plates 53 and 54, the latter having an upstanding sharpened central pin 55 and a series of cork inserts 56. The upper plate 53 has a central knob 57 apertured to fit over the pin 55 and a series of downwardly projecting pins 58 which are adapted to register with and penetrate the cork inserts 56. When operating on hat linings, the material $w$ which is rather stiff in character, is placed between the plates 53, 54, and is held firmly against slippage by the pins 55 and 58. The portions of the work projecting beyond the plates 53, 54, are operated upon by the sewing and cutting mechanisms.

The work-supporting plate 54 is in the form of a turn-table moving about an imaginary and shifting center, whereby the shape of the finished work which, in the present instance, is a stitched figure, is determined. The plate 54 is secured at one point by the screw 59 to the upper end of a vertical pin 65 fixed in the block 61 which is formed at one end of and is rigid with the horizontal cylindrical pin 62. The opposite end of the pin 62 is received within the aperture 63', Fig. 5, in the U-shaped support 64 to which the plate 54 is secured by screws 63. The block 61 and U-shaped support 64 serve to carry and fix the pin 62 in parallel relation to the plate 54.

The vertical pin 65 projects downwardly below the block 61 and is received within the aperture 65', Fig. 13, in the block 66 screwed to the upper face of the ring 67 which is confined to turn in the raceway 48 and runs on the ball bearing ring 68. The ring 67 is provided with peripherally spaced rolls 69 which roll upon the cylindrical wall of the raceway 48, thereby minimizing frictional resistance to the turning movement of the ring 67. By the means described, the pin 65 or, in other words, one point of the work-supporting plate 54 is confined to move in a circular path concentric with the cylindrical wall of the raceway 48.

Embracing the horizontal pin 62 between the blocks 61 and 64 is the guide sleeve 70 having the lateral steadying wings 71 adapted to slidably engage the under side of the work-supporting plate 54. Rigid with the horizontal sleeve 70 is the downwardly extending shaft 72 which is received within and fits the vertical transverse guideway 50 and has adjustably secured to its lower end by the screw 73 and adjustable eccentric which is received within the longitudinal guideway 35. This adjustable eccentric comprises an outer or main cylindrical member 74, Fig. 13, having an eccentric aperture 75 which is adapted to receive the inner cylindrical member 76 formed with an eccentric aperture 77. The centers of the apertures 75 and 77 are equally eccentric to the outer walls of their respective cylindrical members 74 and 76. The outer cylindrical member 74 is rotatably adjustable relative to the inner cylindrical member 76 and is held in adjusted position by the screw 78. By virtue of this adjustment, the outer wall of the main cylindrical member 74 may be shifted from a position concentric with the aperture 77 as illustrated in Figs. 5 and 8 to any desired degree of eccentricity relative thereto, within the limits provided.

The main cylindrical member 74 is formed at its upper end with a flange 74' which rests upon the flat surface 74'' of the support 28 surrounding the guideway 35. A circular plate 74''' is secured to the lower end of the member 74 and its peripheral portion affords a lower flange for confining the member 74 against upward displacement from the guideway 35. The sleeve 70, shaft 72 and parts rigid therewith may thus be considered as a rotatable support for the cylindrical pin 62 and plate 54, which latter may slide relative to the rotatable support in a direction transverse to the axis of rotation of said support.

The inner cylindrical member 76 of the adjustable eccentric is formed at its upper end with a collar 79 concentric with the aperture 77. This collar is formed with peripheral graduations, Fig. 13, which together with similar graduations on the upper face of the cylindrical member 74 indicate the degree of eccentricity of the adjustable eccentric. It is to be understood that this adjustable eccentric may be rotatably adjusted as a whole on the shaft 72 by loosening the screw 73, turning the eccentric on the shaft 72 to the desired position of adjustment and tightening the screw. The sleeve 70 confines the horizontal pin 62 to an axial intersecting relationship with the vertical shaft 72. As shown in Fig. 5, the eccentric 74 is adjusted to a position of zero eccentricity and is concentric with the vertical shaft 72.

Hence, the shaft 72 in this position of adjustment is confined by the guideways 35 and 50 to turn about a stationary vertical axis.

The curb 46 is also shown as adjusted on the carrier 39 so as to be concentric with the axis of the shaft 72. With the parts so adjusted, the work-supporting plate will turn about a stationary center coinciding with the axis of the shaft 72 and the sewing machine or other operating implement will trace a circular path relative to the work.

By adjusting the curb to the left, Figs. 3 and 5, to the successive positions $a$, $b$, $c$ and $d$, the circle is modified into the respective symmetrical ovals $a'$, $b'$, $c'$ and $d'$, Fig. 14; the operating implement being located at $P^1$ in line with the longitudinal center A—B of the work-holder. It will be observed that these ovals are not true ellipses but are somewhat egg shaped, being narrower at their right hand ends than at their left hand ends. By shifting the operating implement to the position $P^2$ the same series of adjustments of the curb will produce an entirely different set of curves as illustrated at $a^2$, $b^2$, $c^2$ and $d^2$. In other words, with the curb adjusted for example to the position $d$, Fig. 3, and the operating implement stationed at $P^1$, the curve $d^1$ will be traced. By merely shifting the operating implement to the position $P^2$ and with no alterations of any of the adjustments, the curve $d^2$ will be traced. By positioning the operating implement successively at $P^3$ and $P^4$, with the curb adjusted at $d$, the curves $d^3$ and $d^4$, respectively, will be traced.

The shape or extent of broadening of the ends of an oval such as $b^1$, Figs. 14 and 15, may be controlled by bringing into action the adjustable eccentric 74. When this eccentric is adjusted to the desired degree of eccentricity and tightened on the shaft 72, say, in dotted line position relative to the guideway 35 and pin 62, as shown at $e^1$, Fig. 16, the curve $b^1$, $e^1$, Fig. 15, will be traced. By merely rotating this eccentric 180° on the shaft 72 or to full line position $e^2$, Fig. 16, the curve $b^1$, $e^2$, Fig. 15, will be traced. To produce a curve which is symmetrical relative to its longitudinal axis, the operating implement must be positioned on the longitudinal center line A—B of the work-holder and the eccentric 74 must be adjusted on the shaft 72 so that the center of the eccentric will lie in the vertical plane through the axis of the pin 62.

Some interesting results are produced by merely shifting the operating implement to various operative positions when the turntable is set to certain given adjustments. For example, with the casing adjusted to the point $d$, Fig. 3, and the eccentric 74 to position $e^2$, Fig. 16, the series of curves $f$ to $m$ illustrated in Fig. 17 will be produced by an operating implement stationed successively at the spaced points $P^1$ and $P^5$ to $P^{11}$ along the horizontal center line A—B of the device. The curve $m$, Fig. 17, is merely a curved line, the operating implement retracing its outward paths in returning to the longitudinal center line. It follows that the curves shown in Fig. 17 may be traced simultaneously in one revolution of the work-supporting plate if a plurality of operating implements are stationed simultaneously at the points $P^1$ and $P^5$ to $P^{11}$.

For sewing a hat tip, the eccentric 74 is, in the majority of instances, adjusted to the zero or concentric position; the adjustment of the casing on the support being found to produce an oval shape having substantially the correct degree of narrowing and broadening at its opposite ends to suit the average hat. Should the adjustment of the casing alone not give the desired shape, further modification of such shape may be secured by adjusting the eccentric 74, it being an easy matter to make the oval more or less contracted at either end, as illustrated in Fig. 15, depending on the degree of eccentricity of the eccentric 74.

The size of the oval produced by the device may be controlled by loosening the thumb-screw 42 and adjusting the carrier-plate 39 and all parts carried thereby toward or away from the operating implement or, in the present instance, the needle of the sewing machine.

Having thus set forth the nature of the invention, what I claim herein is:—

1. A mechanical movement comprising a rotatable guide, means connected to rotate with said guide and slide transversely of the axis of rotation of said guide, means for confining a point on said first-mentioned means to move in a circular path surrounding but eccentric to the axis of rotation of said guide, and means for adjusting said last-mentioned means to vary the degree of eccentricity of said path.

2. A mechanical movement comprising a supporting frame, a rotatable guide, means for reciprocating the axis of rotation of said guide over a fixed path relative to said frame during the rotation of said guide, means rotatable with said guide and slidably connected to the latter for relative movement transversely of the latter's axis of rotation, and means for confining a point only on said second-mentioned means to move in a circular path surrounding the axis of rotation of said guide.

3. A mechanical movement comprising a slide-rod, a guide sleeve entered by said slide-rod and adapted to rotate on an axis at an angle to said slide-rod, means for shifting said axis of rotation to-and-fro in a predetermined path, means for moving a point in the length of said rod in a curved path surrounding the axis of rotation of said sleeve, and means for effecting a relative adjustment of said curved path and the path of to-and-fro movement of said sleeve.

4. A mechanical movement comprising a supporting shaft, superposed guideways disposed at an angle to one another and entered by said shaft, an eccentric on said shaft fitting one of said guideways for controlling the position of said shaft in the other guideway during said shaft's rotation, means rotatable with and connected to said shaft for relative sliding movement transversely of the latter, and means for confining a point on said first-mentioned means to move in a curved path surrounding said shaft.

5. A mechanical movement comprising a shaft, superposed guideways disposed at an angle to one another and entered by said shaft, an adjustable eccentric on said shaft fitting one of said guideways for controlling the position of said shaft in the other guideway during said shaft's rotation, means rotatable with and connected to said shaft for relative sliding movement transversely of the latter, means for confining a point on said first-mentioned means to move in a circular path surrounding but eccentric to said shaft, and means for varying the degree of eccentricity of said path.

6. The combination with an operating tool, of a work-holder comprising a rotatable guide, a work-supporting plate rotatable with and slidably connected to said guide, means for fixing the work relative to said work-supporting plate, and means for confining a point on said work-supporting plate to move in a circular path around and eccentric to the axis of rotation of said guide.

7. A work-holder comprising a plate, a rod rigidly mounted on the under side of and parallel to said plate, a guide sleeve in which said rod has a sliding movement, a sleeve supporting shaft at an angle to said rod, confining means for determining the position of rotation of said shaft, a pin carried by said plate, and a curved guide surrounding said shaft for directing the motion of said pin as said plate is rotated.

In testimony whereof, I have signed my name to this specification.

RUDOLPH BECKER.